United States Patent
Moriguchi

(10) Patent No.: US 7,426,424 B2
(45) Date of Patent: Sep. 16, 2008

(54) MOVING BODY SYSTEM

(75) Inventor: Toshiki Moriguchi, Nagaokakyo (JP)

(73) Assignee: Murata Kikai Kabushiki Kaisha, Kyoto-shi (JP)

( * ) Notice: Subject to any disclaimer, the term of this patent is extended or adjusted under 35 U.S.C. 154(b) by 182 days.

(21) Appl. No.: 11/076,859

(22) Filed: Mar. 11, 2005

(65) Prior Publication Data

US 2005/0203699 A1 Sep. 15, 2005

(30) Foreign Application Priority Data

Mar. 12, 2004 (JP) .............................. 2004-070810

(51) Int. Cl.
*E01B 25/06* (2006.01)
(52) U.S. Cl. ...................... 700/214; 700/258; 700/300; 104/130.07; 104/130.08; 702/150
(58) Field of Classification Search ................... 700/13, 700/56–59, 69, 112–113, 213, 214; 701/22
See application file for complete search history.

(56) References Cited

U.S. PATENT DOCUMENTS

| | | | | |
|---|---|---|---|---|
| 772,732 A * | 10/1904 | Morgan et al. | ......... | 104/130.08 |
| 787,590 A * | 4/1905 | Sessions | ................ | 104/130.08 |
| 813,506 A * | 12/1906 | Lynch | ................... | 104/130.08 |
| 1,517,549 A * | 12/1924 | Espenschied | ............. | 246/63 R |
| 3,593,668 A * | 7/1971 | Adams | ........................ | 104/120 |
| 3,598,060 A * | 8/1971 | Chitra, Jr. | ................... | 104/168 |
| 3,784,791 A | 1/1974 | Pease | | |
| 3,845,286 A * | 10/1974 | Aronstein et al. | ........... | 700/102 |
| 3,850,105 A * | 11/1974 | Aronstein et al. | ........... | 104/307 |

(Continued)

FOREIGN PATENT DOCUMENTS

EP 0 211 327 A 2/1987

(Continued)

OTHER PUBLICATIONS

Notification of Reason(s) for Refusal of the Japanese Patent Application No. 2004-070810 from the Japanese Patent Office, with English translation.

(Continued)

*Primary Examiner*—Thomas G. Black
*Assistant Examiner*—Ari M Diacou
(74) *Attorney, Agent, or Firm*—Westerman, Hattori, Daniels & Adrian, LLP.

(57) ABSTRACT

It is an object of the present invention to provide a moving body system which can determine the moving position of a vehicle, stacker crane, or other moving body wherever on a moving path having a branching portion or a joining portion the moving body is, the system being able to precisely stop the moving body at any position and enabling the moving body to move fast to a stop position. A moving body system includes a vehicle 1 moving along running rails 2, 2 constituting a moving path having a joining portion and a detected member 20 laid along the running rails 2, 2. The detected member 20 includes a large number of mark members 21, 21, . . . in a direction in which the vehicle 1 moves. The vehicle 1 includes a first detecting sensor 11 and a second detecting sensor 12 which detect the mark members of the detected member 20.

5 Claims, 13 Drawing Sheets

U.S. PATENT DOCUMENTS

| | | | |
|---|---|---|---|
| 4,207,569 A * | 6/1980 | Meyer | 342/44 |
| 4,362,977 A * | 12/1982 | Evans et al. | 700/254 |
| 4,415,975 A * | 11/1983 | Burt | 414/273 |
| 4,510,565 A * | 4/1985 | Dummermuth | 700/7 |
| 4,519,140 A | 5/1985 | Schmitt et al. | |
| 4,815,190 A * | 3/1989 | Haba et al. | 29/430 |
| 4,846,297 A | 7/1989 | Field et al. | |
| 4,846,298 A | 7/1989 | Naito | |
| 4,870,592 A * | 9/1989 | Lampi et al. | 700/112 |
| 4,901,073 A * | 2/1990 | Kibrick | 341/13 |
| 4,934,279 A * | 6/1990 | Azukizawa et al. | 104/130.02 |
| 4,969,713 A * | 11/1990 | Wyckoff | 359/538 |
| 5,010,974 A | 4/1991 | Matsuda | |
| 5,021,781 A * | 6/1991 | Salazar et al. | 341/13 |
| 5,047,676 A * | 9/1991 | Ichikawa | 310/12 |
| 5,056,437 A | 10/1991 | Maddock | |
| 5,087,164 A * | 2/1992 | Mukaimoto | 414/282 |
| 5,138,560 A * | 8/1992 | Lanfer et al. | 235/454 |
| 5,235,181 A | 8/1993 | Durana et al. | |
| 5,279,672 A | 1/1994 | Betker et al. | |
| 5,511,005 A * | 4/1996 | Abbe et al. | 702/84 |
| 5,511,896 A * | 4/1996 | Marcato | 404/72 |
| 5,592,793 A * | 1/1997 | Damratowski et al. | 52/182 |
| 5,638,268 A * | 6/1997 | Souza | 700/56 |
| 5,713,540 A * | 2/1998 | Gerszberg et al. | 246/121 |
| 5,743,495 A * | 4/1998 | Welles et al. | 246/121 |
| 5,751,230 A * | 5/1998 | Brandestini | 341/10 |
| 5,781,451 A * | 7/1998 | Lofthus et al. | 702/94 |
| 5,839,084 A | 11/1998 | Takasaki et al. | |
| 5,900,708 A * | 5/1999 | Den Engelse et al. | 318/640 |
| 5,904,101 A * | 5/1999 | Kuznetsov | 104/281 |
| 6,009,189 A * | 12/1999 | Schaack | 382/154 |
| 6,095,054 A * | 8/2000 | Kawano et al. | 104/139 |
| 6,151,533 A * | 11/2000 | Iwasaki et al. | 700/214 |
| 6,155,766 A * | 12/2000 | Ostwald et al. | 414/279 |
| 6,169,935 B1 * | 1/2001 | Iwasaki et al. | 700/214 |
| 6,192,294 B1 * | 2/2001 | Chiba | 700/214 |
| 6,298,941 B1 * | 10/2001 | Spadafora | 180/422 |
| 6,305,760 B1 | 10/2001 | Otake | |
| 6,374,748 B1 * | 4/2002 | Shiwaku et al. | 104/243 |
| 6,409,451 B1 * | 6/2002 | Fallin et al. | 414/282 |
| 6,452,158 B1 * | 9/2002 | Whatley et al. | 250/231.13 |
| 6,508,350 B1 * | 1/2003 | Ouellette | 198/358 |
| 6,510,365 B1 * | 1/2003 | Nishinakayama et al. | 700/214 |
| 6,535,790 B2 * | 3/2003 | Nakano et al. | 700/214 |
| 6,543,591 B2 * | 4/2003 | Kuzuya | 191/10 |
| 6,547,022 B2 | 4/2003 | Hosomi et al. | |
| 6,567,713 B2 * | 5/2003 | Lichtenstein et al. | 700/58 |
| 6,606,549 B1 * | 8/2003 | Murakami et al. | 701/89 |
| 6,644,208 B2 * | 11/2003 | Akiyama | 104/130.01 |
| 6,711,283 B1 * | 3/2004 | Soenksen | 382/133 |
| 6,870,797 B2 * | 3/2005 | Reasoner et al. | 369/30.29 |
| 6,987,465 B2 * | 1/2006 | Mittmann | 341/15 |
| 7,034,283 B2 * | 4/2006 | Williams et al. | 250/231.16 |
| 2002/0021955 A1 * | 2/2002 | Kawaguchi | 414/278 |
| 2002/0033319 A1 * | 3/2002 | Fukushima | 198/570 |
| 2002/0055789 A1 * | 5/2002 | Ben-Ezra et al. | 700/59 |
| 2002/0104726 A1 * | 8/2002 | Kuzuya | 191/6 |
| 2002/0154974 A1 * | 10/2002 | Fukuda et al. | 414/416.01 |
| 2002/0157562 A1 * | 10/2002 | Akiyama | 104/130.01 |
| 2003/0023343 A1 * | 1/2003 | Tomita et al. | 700/221 |
| 2003/0229416 A1 * | 12/2003 | Tai et al. | 700/213 |
| 2003/0236587 A1 * | 12/2003 | Ono | 700/112 |
| 2004/0024489 A1 * | 2/2004 | Fujiki et al. | 700/213 |
| 2005/0021196 A1 * | 1/2005 | Moriguchi | 701/23 |
| 2005/0055815 A1 * | 3/2005 | Giett et al. | 29/91.7 |
| 2006/0016363 A1 * | 1/2006 | Nakao et al. | 104/88.01 |
| 2006/0212164 A1 * | 9/2006 | Abraham et al. | 700/215 |
| 2007/0000405 A1 * | 1/2007 | Nakao | 104/130.07 |

FOREIGN PATENT DOCUMENTS

| | | |
|---|---|---|
| EP | 0 472 028 A2 | 2/1992 |
| EP | 0 937 965 A | 8/1999 |
| GB | 2 221 758 A | 2/1990 |
| JP | 57-081006 | 5/1982 |
| JP | 60-73304 U | 5/1985 |
| JP | 61 260103 A | 11/1986 |
| JP | 63016209 A | 1/1988 |
| JP | 63-180521 | 7/1988 |
| JP | 63231211 A | 9/1988 |
| JP | 01077401 A | 3/1989 |
| JP | 01-231610 A | 9/1989 |
| JP | 05-142241 | 6/1993 |
| JP | 05 297010 A | 11/1993 |
| JP | 06-107178 | 4/1994 |
| JP | H07-107624 A | 4/1995 |
| JP | 07-177610 A | 7/1995 |
| JP | H07-191753 A | 7/1995 |
| JP | 09-14003 A | 5/1997 |
| JP | H09-198143 A | 7/1997 |
| JP | 10-167463 | 6/1998 |
| JP | H10-232712 A | 9/1998 |
| JP | 11-265211 | 9/1999 |
| JP | 11243604 A | 9/1999 |
| JP | 2000-209705 A | 7/2000 |
| JP | 2001-216024 | 8/2001 |
| JP | 2001240213 A | 9/2001 |
| JP | 2002-351541 | 12/2002 |
| JP | 2003-033565 A | 2/2003 |

OTHER PUBLICATIONS

Notification of Reason(s) for Refusal of the Japanese Patent Application No. 2004-070810, dated Jun. 3, 2008, from the Japanese Patent Office.

* cited by examiner

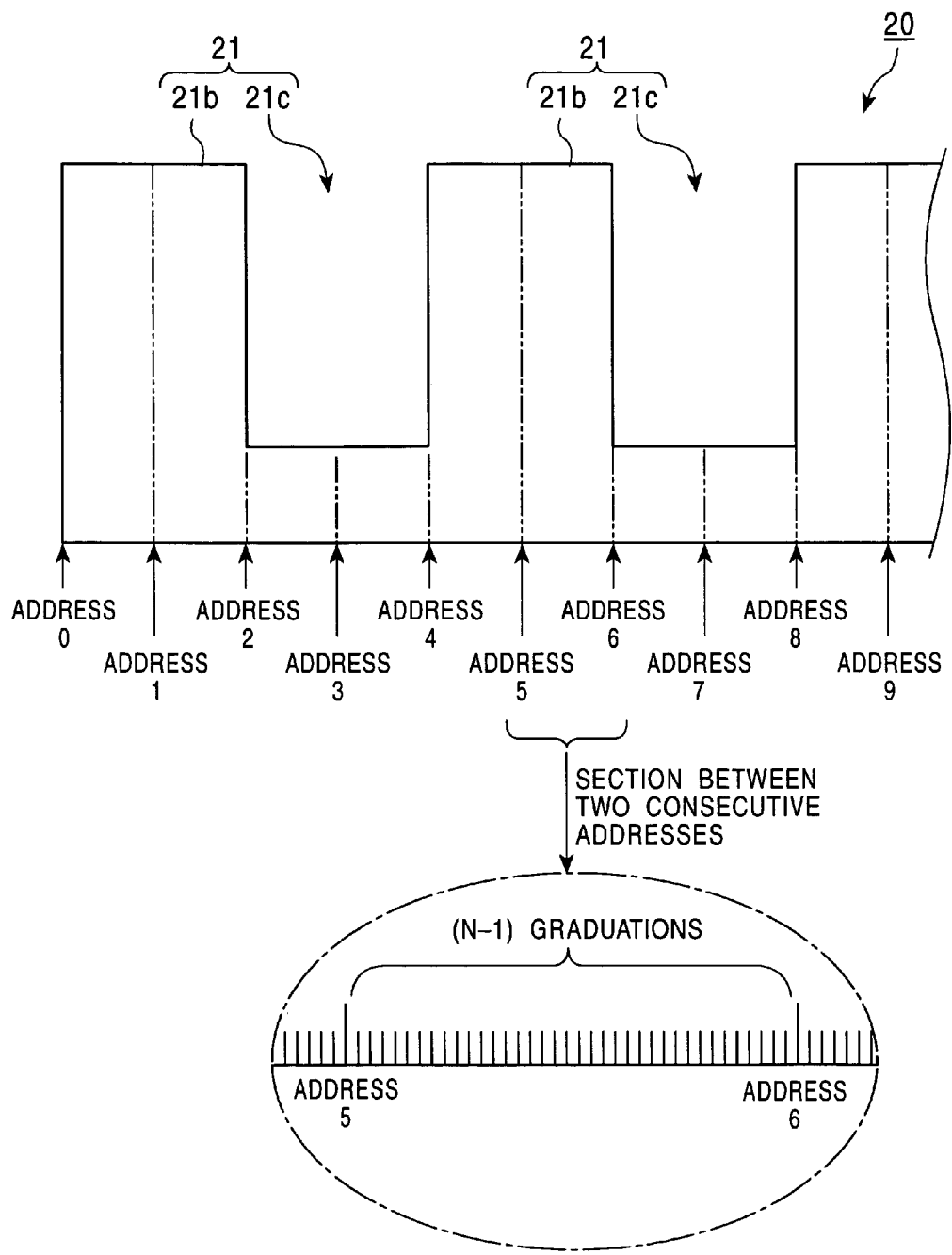

MOVING BODY SYSTEM

FIELD OF THE INVENTION

The present invention relates to a moving body system that moves a moving body along a moving path.

SUMMARY OF THE INVENTION

A known automated guided vehicle system is used in a semiconductor manufacturing plant or the like, and in the automated guided vehicle system, a moving path is laid along processing devices and the like. An automated guided vehicle is caused to run automatically on the moving path to convey work pieces. The automated guided vehicle needs to be precisely stopped in front of a processing device. The automated guided vehicle system is configured as described below.

FIG. 14 is a diagram generally showing the configuration of a conventional automated guided vehicle system. Processing devices 104, 104, . . . are arranged along a running path 102 of an automated guided vehicle 101. Stop position marks 120 are stuck to respective stop positions of the vehicle 101 which correspond to the processing devices 104, 104, . . . and the like. The vehicle 101 is provided with a marker detecting sensor 115 to detect the stop position markers 120.

When a destination (any of the processing devices 104 or the like) for the vehicle 101 is specified, a running program is constructed in which acceleration and deceleration timings and the like are written, and running of the vehicle 101 is then controlled in accordance with the running program. An encoder is provided on a rotating shaft of wheels of the vehicle 101. Output pulses from the encoder are counted to calculate the distance that the vehicle 101 has run. As the vehicle 101 nears the target processing device 104, it starts to be decelerated (see FIG. 14A), and the speed is sufficiently reduced so that the vehicle 101 runs at an about-to-stop speed at which it can stop immediately at any time (see FIG. 14B). Then, the marker detecting sensor 115 detects the leading end of the stop position marker 120 at the destination (see FIG. 14C).

The counting of output pulses from the encoder is then restarted. When the marker detecting sensor 115 reaches the center of the stop position marker 120 in its longitudinal direction, the wheels of the vehicle 101 are stopped (see FIG. 14D). The stop control of the vehicle 101 is performed as described above to precisely stop the vehicle 101 at the destination.

However, during running, the wheels of the vehicle 101 may slip on the running path 102. In particular, a slip is likely to occur when the vehicle 101 is accelerated or decelerated. When the slip occurs, there may be a difference between the running distance obtained by accumulating the output pulses from the encoder and the actual running distance. As a result, the vehicle 101 starts to decelerate prematurely. The vehicle 101 then reaches the about-to-stop speed considerably before the destination. The vehicle 101 then carries out creep running at the about-to-stop speed until it reaches the destination. However, such an approach requires a long time, resulting in a serious time loss. This disadvantageously degrades the workability of the system.

Thus, in view of this problem, the Unexamined Japanese Patent Application Publication (Tokkai) No. 2002-351541 discloses an automated guided vehicle system improved as described below.

As shown in FIG. 15, a large number of markers 220, 220, . . . are stuck to and along a running path 202 of a vehicle 201. The markers 220, 220, . . . are stuck not only to positions corresponding to processing devices 204, 204, . . . but also to the positions between the processing devices 204. The vehicle 201 is provided with a marker detecting sensor 215 that detects the markers 220. Before the vehicle 201 reaches the marker 220 located at a position immediately before a target stop position 208, speed control is performed in accordance with the running path 202. Between the position 207 and the stop position 208, the speed and a deceleration start position are controlled on the basis of the distance to the stop position 208.

When a destination (any of the processing devices 204 or the like) is specified, the vehicle 201 runs at a speed specified by a running program until it detects the marker 220 at the position 207 immediately before the stop position 208 corresponding to the destination. As shown in FIG. 15A, the marker detecting sensor 215 of the vehicle 201 detects the trailing end of the position 207 immediately before the stop position 208. Then, a pulse count value in an encoder provided on a rotating shaft of wheels of the vehicle 201 is preset to zero. That is, the trailing end of the marker 220 is used as a reference position for the pulse counting executed by the encoder. Then, speed control is performed while counting output pulses from the encoder to calculate the running distance of the vehicle 201 from the marker 220 at the position 207 immediately before the stop position 208. The vehicle 201 then reaches the deceleration start position, which is preset to allow the vehicle 201 to stop precisely at the stop position 208. Then, deceleration control is performed to obtain a predetermined deceleration.

As shown in FIG. 15B, the vehicle 201 nears the target stop position 208 and detects the leading end of the marker 220 provided at the stop position 208.

Then, the pulse count value in the encoder is preset again. The stop control of the vehicle 201 is started at the point where the leading end of the marker 220 at the stop position 208 is detected. Thus, the counting of pulses by the encoder is restarted at the leading end of the marker 220 at the stop position 208. Control is performed such that the running speed of the vehicle 201 is further reduced, while accumulating the running distance of the vehicle 201. Then, as shown in FIG. 15C, the wheels of the vehicle 201 are stopped at the position where the marker detecting sensor 215 detects the trailing end of the marker 220 at the stop position 208. The vehicle 201 is thus precisely stopped at the stop position.

With the latter conventional technique (the Unexamined Japanese Patent Application Publication (Tokkai) No. 2002-351541), there is only a short distance between the stop position 208 and the position immediately before the stop position 208. Accordingly, there is only a small difference between the actual running distance and the running distance obtained by accumulating output pulses from the encoder on the basis of the detection of the trailing end of the marker 220 at the position 207. This substantially avoids the disadvantageous situation in which the vehicle 201 starts to decelerate prematurely and in which it thus takes the vehicle 201 too long a time to reach the destination, as in the case of the conventional technique. The vehicle 201 can also move fast between the position 207 and the stop position 208. Further, the vehicle 201 can be precisely stopped at the stop position 208.

However, the vehicle 201 can thus be controllably stopped only at the stop positions 208, 208, . . . When the vehicle 201 is stopped at other positions, such problems as associated with the former conventional technique may occur.

Moreover, when the layout of the automated guided vehicle system is changed or new facilities are added to the system, the markers 220, 220, . . . must be repositioned.

Furthermore, the newly attached markers 220, 220, . . . must be taught to the vehicle 201. The vehicle 201 must be experimentally operated to check whether or not it can stop precisely at the positions of the markers 220, 220, . . . This checking operation requires much time and effort and is cumbersome. This is another problem to be solved.

In view of these problems, it is an object of the present invention to provide a moving body system which makes it possible to determine the moving position of a moving body such as a vehicle or a stacker crane wherever on a moving path the moving body is and which enables the moving body to stop precisely at any position, the moving body system also enabling the moving body to move fast to the stop position, the moving body system also enabling the moving body to stop at a precise position even if the moving path has a branching portion or a joining portion.

A description has been given of the problems to be solved by the present invention. Now, the description will be given of means for solving the problems.

SUMMARY OF THE INVENTION

As set forth in claim 1, the present invention provides a moving body system comprising a moving body that moves along a moving path and a detected member laid along the moving path, wherein the detected member comprises a large number of mark members in a direction in which the moving body moves and the moving body comprises detecting means for detecting the mark members of the detected member, wherein each of the mark members comprises a detected portion that can be detected by the detecting means and a non-detected portion that is not detected by the detecting means, wherein the detected member is configured like comb teeth in which a comb tooth portion is the detected portion, while a void between the comb teeth is the non-detected portion, wherein the width of the detected portion in the moving direction of the moving body is equal to that of the non-detected portion in the moving direction of the moving body, wherein the detecting means comprises first detecting means and second detecting means arranged in the moving direction of the moving body, and wherein a moving path of the moving body has a branching portion that branches to at least two paths, and a second detected member is provided on each of the branching paths, while the moving body is provided with second detecting means for detecting the second detected member.

Further, as set forth in claim 2, the present invention provides a moving body system comprising a moving body that moves along a moving path and a detected member laid along the moving path, wherein the detected member comprises a large number of mark members in a direction in which the moving body moves and the moving body comprises detecting means for detecting the mark members of the detected member, wherein each of the mark members comprises a detected portion that can be detected by the detecting means and a non-detected portion that is not detected by the detecting means, wherein the detected member is configured like comb teeth in which a comb tooth portion is the detected portion, while a void between the comb teeth is the non-detected portion, wherein the width of the detected portion in the moving direction of the moving body is equal to that of the non-detected portion in the moving direction of the moving body, wherein the detecting means comprises first detecting means and second detecting means arranged in the moving direction of the moving body, and wherein a moving path of the moving body has a joining portion in which at least two paths are joined together, and a third detected member is provided on a resulting path so that the second detecting means can sense the third detected member.

Furthermore, as set forth in claim 3, the detected members have positional information, and the detecting means read the positional information from the detected members.

Moreover, as set forth in claim 4, the moving body comprises an encoder that measures a moving distance and control means for controlling the moving speed of the moving body by determining a moving position while using the detecting means to detect the mark members of the detected member until the mark member of the detected member located immediately before a stop target position is reached, the control means then using, between the mark member located immediately before the stop target position and the stop target position, the encoder to measure the moving distance from the mark member located immediately before the stop target position, the control means then stopping the moving body at the stop target position.

Finally, as set forth in claim 5, the control means resets the measurement of the moving distance by the encoder to an origin every time the detecting member detects a detecting point on the mark member of the detected member.

First, with the aspect of the invention set forth in claim 1, the moving body uses the detecting means to detect the mark members of the detected member laid along the moving path. Consequently, the moving position of the moving body can be substantially precisely determined wherever on the moving path the moving body is. This avoids the situation in which there is a difference between the actual moving distance and the moving distance determined by the moving body and in which the vehicle thus starts to decelerate prematurely and starts to run at an about-to-stop speed considerably before the stop position. The moving body can also move fast to the stop position. The moving body system thus has an improved workability. Further, after the moving body has passed the branching portion, the second detecting means of the moving body detects the second detected member. This makes it possible to check into which moving path the moving body has advanced. The moving body system is thus more reliable.

With the aspect of the present invention set forth in claim 2, after the moving body has passed the joining portion, the second detecting means of the moving body detects the third detected member. This makes it possible to confirm that the moving body has passed the joining portion. The moving body system is thus more reliable.

Further, with the aspect of the present invention set forth in claim 3, the detecting means of the moving body detects positional information on the detected member to check whether or not the detecting means has failed to detect any part of the detected member. If the detecting means should fail to detect any part of the detected member, corrections will be made to improve the reliability of the moving body system.

Furthermore, with the aspect of the present invention set forth in claim 4, before the moving body reaches the mark member immediately before the stop target position, the moving speed of the moving body is controlled by using the detecting member to detect the mark members of the detected member to roughly determine the moving position of the moving body. Between the mark member immediately before the stop target position and the stop target position, the encoder is used to measure the moving distance from the mark member immediately before the stop target position. Thus, the moving body is precisely stopped at the stop target position. This configuration avoids the situation in which there is a difference between the actual moving distance and the moving distance determined by the moving body and in which the vehicle thus starts to decelerate prematurely and starts to run at the about-to-stop speed considerably before the stop position. The moving body can also move fast to the stop position. The moving body system thus has an improved workability. Further, with this configuration, the moving body can be precisely stopped at any position on the path. The moving body system is thus more convenient.

Moreover, with the aspect of the present invention set forth in claim 5, every time the detecting means detects the detecting point on the mark member of the detected member, the control means resets the measurement of the moving distance by the encoder to the origin. This makes it possible to carry out measurement of the moving distance without being affected by errors from previous operations. The moving body system is thus more reliable.

DETAILED DESCRIPTION OF THE PREFERRED EMBODIMENTS

A moving body system according to the present invention will be described below with reference to an automated guided vehicle system by way of example.

FIG. 1 generally shows the configuration of the automated guided vehicle system. In a clean room of a semiconductor manufacturing plant or the like, running rails 2, 2 are laid as a moving path of an automated guided vehicle 1. Processing devices 4, 4, . . . and the like are arranged along the running rails 2, 2. A detected member 20 is also laid along the running rails 2. The vehicle 1 running on the running rails 2, 2 determines its own running position while detecting the detected member 20. According to the present embodiment, the detected member 20 is placed outside one 2 of the running rails 2, 2. However, the detected member 20 may be placed between the running rails 2, 2 or installed above the running rails 2, 2. The arrangement of the detected member 20 is not particularly limited provided that it is extended along the moving path of the vehicle 1.

The detected member 20 is provided with a large number of mark members 21, 21, . . . in a direction in which the vehicle 1 moves. Each of the mark members 21 comprises a detected portion 21b that can be detected by detecting means of the vehicle 1 and a non-detected portion 21c that is not detected by the detecting means. FIG. 2 shows an example of the detected member 20. The detected member 20 is configured like comb teeth. A comb tooth portion constitutes the detected portion 21b, and the gap between the comb teeth constitutes the non-detected portion 21c. In the moving direction of the vehicle 1, the width of the detected portion 21b is equal to that of the non-detected portion 21c. With this configuration, the distance from an ON signal obtained when detecting means described later detects one end of the detected portion 21b to an OFF signal obtained when the detecting means detects the other end of the detected portion 21b (one end of the non-detected portion 21c) is the same as the distance from an OFF signal obtained when the detecting means detects the other end of the detected portion 21b (one end of the non-detected portion 21c) to an ON signal obtained when the detecting means detects one end of the adjacent detected portion 21b (the other end of the non-detected portion 21c). This simplifies a control configuration. The moving distance can thus be determined simply by counting the number of ON and OFF signals. The detected member 20 is not limited to the comb tooth configuration but may be shaped like a ladder laid on the ground. The configuration of the detected member is not particularly limited.

Now, the vehicle 1 will be described.

As shown in FIGS. 3 and 4, the vehicle 1, which is a moving body, has a main body 1B supported by front wheels 19F, 19F and rear wheels 19R, 19R. The vehicle 1 has a four-wheel drive configuration in order to suppress slips. Driving sources 18F, 18R are mounted on the front wheels 19F, 19F and the rear wheels 19R, 19R, respectively (see FIG. 5). The driving sources 18F, 18R are composed of, for example, servo motors that can rotated in a forward and backward directions. The vehicle 1 can thus be moved forward and backward.

FIG. 5 shows the control configuration of the vehicle 1. A controller 10 is mounted on the vehicle 1 to control the running of the vehicle and the transfer of loads. The controller 10 connects communicatively to a running control section 16F that controls the driving source 18F of the front wheels 19F, 19F and to a running control section 16R that controls the driving source 18R of the rear wheels 19R, 19R. Encoders 17F, 17R are mounted on driving shafts of the driving sources 18F, 18R, respectively, to measure the moving distance of the vehicle 1. The encoders 17F, 17R are communicatively connected to the controller 10. While the vehicle 1 is in motion, the encoders 17F, 17R, which are rotation speed detecting means, detect the rotation speeds of the wheels 19F, 19F, 19R, 19R. When the vehicle 1 accelerates or runs at an equal speed, the controller 10, which is control means, refers to measured values from the encoder 17R (or 17F) of the driving source 18R (or 18F) of the wheels 19R, 19R (or 19F, 19F) located in the rear of the vehicle 1 in the advancing direction. When the vehicle 1 decelerates, the controller 10 refers to measured values from the encoder 17F (or 17R) of the driving source 18F (or 18R) of the wheels 19F, 19F (or 19R, 19R) located in the front of the vehicle 1 in the advancing direction.

This is because during acceleration, gravity acts on the wheels 19R, 19R (or 19F, 19F) located in the rear of the vehicle 1 in the advancing direction to cause the front wheels 19F, 19F (19R, 19R) to float, so that the front wheels 19F, 19F (or 19R, 19R) are likely to slip on the running rails 2, 2. In this case, the controller 10 determines the moving speed or the moving distance on the basis of the measured values from the encoder 17R (or 17F) of the driving source 18R (or 18F) of the rear wheels 19R, 19R (or 19F, 19F). On the other hand, during deceleration, gravity acts on the wheels 19F, 19F (or 19R, 19R) located in the front of the vehicle 1 in the advancing direction to cause the rear wheels 19R, 19R (19F, 19F) to float, so that the rear wheels 19R, 19R (or 19F, 19F) are likely to slip on the running rails 2, 2. In this case, the controller 10 determines the moving speed or the moving distance on the basis of the measured values from the encoder 17F (or 17R) of the driving source 18F (or 18R) of the rear wheels 19F, 19F (or 19R, 19R).

According to the present embodiment, during movement at an equal speed, the controller 10 determines the moving speed or the moving distance on the basis of the measured values from the encoder 17R (or 17F) of the driving source 18R (or 18F) of the rear wheels 19R, 19R (or 19F, 19F). However, the controller 10 may determine the moving speed or the moving distance on the basis of the measured values from the encoder 17F (or 17R) of the driving source 18F (or 18R) of the rear wheels 19F, 19F (or 19R, 19R). The above configuration enables the controller 10 to switch to the encoder 17F/17R corresponding to the wheels 19F, 19F or 19R, 19R which are unlikely to slip, depending on whether the vehicle 1 accelerates or decelerates. Thus, the controller 10 more precisely measures the moving speed or the moving distance. The moving body system is thus more reliable.

Further, depending on whether the vehicle 1 accelerates or decelerates, the controller 10 determines a torque used to drive the wheels 19F, 19F and a torque used to drive the wheels 19R, 19R. The controller 10 outputs torque instruction values to the running control sections 16F, 16R. The running control section 16F (16R) then controls the torque of the driving source 18F (18R) on the basis of the torque instruction value. The torque instruction values for the running control sections 16F, 16R are determined so as to minimize the slip of the wheels 19F, 19F, 19R, 19R on the running rails 2, 2. When the vehicle 1 accelerates, the torque instruction value for the running control section 16R (or 16F) corresponding to the wheels 19R, 19R (or 19F, 19F) located in the rear in the advancing direction and on which the gravity acts is set larger than that for the running control section 16F (or 16R) corresponding to the front wheels 19F, 19F (or 19R, 19R). When the vehicle 1 decelerates, the torque instruction value for the running control section 16F (or 16R) corresponding to the wheels 19F, 19F (or 19R, 19R) located in the front in the advancing direction and on which the gravity acts is set larger than that for the running control section 16R (or 16F) corresponding to the rear wheels 19R, 19R (or 19F, 19F). For movement at an equal speed, the torque instruction value for the running control section 16F corresponding to the wheels 19F, 19F is set equal to that for the running control section 16R corresponding to the wheels 19R, 19R.

For example, the ratio of the torque instruction value for the running control section 16F (or 16R) corresponding to the wheels 19F, 19F (or 19R, 19R) located in the front in the advancing direction to the torque instruction value for the running control section 16R (or 16F) corresponding to the wheels 19R, 19R (or 19F, 19F) located in the rear is set at 4 to 6 for acceleration, 6 to 4 for deceleration, or 5 to 5 for equal-speed running. The ratio of the torque values is not limited to the fixed values but may be varied on the basis of a rotation speed from the encoder 17F or 17R.

FIG. 3 is a plan view showing the configuration of the vehicle 1. A bracket 14 is attached to a side of the vehicle 1. The bracket 14 is provided with detecting means for detecting the mark members 21, 21, . . . of the detected member 20. The detecting means are comprised of a first detecting sensor 11 and a second detecting sensor 12. Each detecting sensor 11 (12) is composed of a photosensor comprising a light emitting element 11a (12a) and a light receiving element 11b (12b).

As shown in FIG. 4, the bracket 14 appears like the letter U turned upside down in a front view. The detected member 20 is located in the space enclosed by the letter U turned upside down. The light emitting elements 11a, 12a are attached to one (inner) vertical area of the bracket 14 via the space. The light receiving elements 11b, 12b are attached to the other (outer) vertical area. The first detecting sensor 11 and the second detecting sensor 12 are arranged in the moving direction of the vehicle 1. The spacing W between the first detecting sensor 11 and the second detecting sensor 12 is half the width D [mm] of the detected portion 21b of the detected member 20 in the moving direction of the vehicle 1 (see FIG. 3). In general, when the width of the detected portion 21b is defined as D, the spacing W between the first detecting sensor 11 and the second detecting sensor 12 is set so as to meet the relation shown below.

$$W = \left(2n + \frac{1}{2}\right)D \ (n = 0, 1, 2, \ldots)$$

In the above configuration, the light emitting element 11a (12a) of each detecting sensor 11 (12) emits a light beam to the light receiving element 11b (12b). The light beam is blocked and then unblocked every time the vehicle 1 moves to cause the detecting sensor 11 (12) to pass the detected portions 21b, 21b, . . . of the detected member 20.

Specifically, when the detecting sensor 11 (12) reaches one end of the detecting sensor 11 (12), the light beam from the light emitting element 11a (12a) to the light receiving element 11b (12b) is blocked to output an OFF signal to the controller 10. When the detecting sensor 11 (12) passes the other end of the detected portion 21b to reach the non-detected portion 21c, the light receiving element 11b (12b) receives the light beam from the light emitting element 11a (12a) to output an ON signal to the controller 10. In this manner, the detecting sensor 11 (12) intermittently outputs the ON/OFF signal to the controller 10.

The controller 10 also comprises an address counter that counts the number of ON and OFF signals from the detecting sensors 11, 12 (see FIG. 8). The controller 10 roughly determines the moving position of the vehicle 1 on the basis of the number of signals counted by the address counter. This operation will be described in brief. As shown in FIG. 6, addresses are assigned to the detected portions 21b, 21b, . . . and non-detected portions 21c, 21c, . . . of the mark members 21, 21, . . . of the detected member 20 with reference to the detected portion 21b or non-detected portion 21c of a certain mark member 21. The addresses are consecutive from one to the other end of the detected member 20 in its longitudinal direction. The controller 10 counts the number of ON and OFF signals from the detecting sensors 11, 12 to determine which address has been reached by the vehicle. The controller 10 then determines the moving position of the vehicle 1 on the basis of the address determined. The assignment of the addresses will be described later in detail.

Further, the controller 10 can use the first detecting sensor 11 and second detecting sensor 12, arranged in parallel in the moving direction of the vehicle 1, to determine the moving direction of the vehicle 1. Specifically, if the first detecting sensor 11 detects a certain detected portion 21b (or non-detected portion 21c) on the detected member 20 earlier than the second detecting sensor 12, the controller 10 determines that the vehicle 1 is moving forward. In contrast, if the second detecting sensor 12 detects the certain detected portion 21b (or non-detected portion 21c) on the detected member 20 earlier than the first detecting sensor 11, the controller 10 determines that the vehicle 1 is moving backward.

Moreover, a plurality of detected members 23, 23, . . . are arranged along the running rails 2, which are the moving paths of the vehicle 1 (see FIG. 1).

A detecting device 13 is provided at the bottom of the vehicle 1 to detect the detected members 23, 23, . . . The detected members 23, 23, . . . are arranged at predetermined intervals in association with the addresses on the detected member 20. According to the present embodiment, the detected members 23 are arranged outside one 2 of the running rails 2, 2. However, the detected members 23 may be arranged between the running rails 2, 2. The arrangement of the detected members 23 is not particularly limited provided that they are arranged along the path of the vehicle 1.

A bar code 23b is stuck to each of the detected members 23 and indicates positional information on the position of the detected member 23. The detecting device 13, mounted on the vehicle 1, reads the bar codes 23b, 23b, . . . of the detected members 23, 23, . . . to determine a passing point. The detected members 23, 23, . . . are not limited to the bar codes, and RFID tags or the like may be stuck to the detected members 23. Alternatively, it is possible to stick nothing to the detected members 23 and to cause the detecting device 12 to only detect the detected members 23, 23, . . . In this case, the number of detected members 23, 23, . . . detected by the controller 10 is counted to determined the passing point.

Now, the addresses on the detected member 20 will be described.

As shown in FIG. 6, in each of the mark members 21 of the detected member 20, addresses are assigned to four positions including the opposite ends and center of the detected portion 21b and the center of the non-detected portion 21c in the moving direction of the vehicle 1. The combination of the first detecting sensor 11 and second detecting sensor 12 detects the four addresses of each mark member 21 and then outputs a corresponding detection signal to the controller 10. The controller 10 uses the address counter to count the addresses to roughly determine the moving position of the vehicle 1.

As previously described, the spacing between the first detecting sensor 11 and the second detecting sensor 12 is half the width of the detected portion 21b (or non-detected portion 21c) of the detected member 20 in the moving direction of the vehicle 1. The two detecting sensors 11, 12 detect each mark member 21 of the detected member 20 as described below.

As shown in FIG. 7, the vehicle 1 is in motion, and at a first detecting point, the first detecting sensor 11 detects one end of the detected portion 21b of the mark member 21 (see FIG. 7A). At the first detecting point, the first detecting sensor 11 outputs an ON signal to the address counter of the controller 10. Then, at a second detecting point, the second detecting sensor 12 detects the one end of the detected portion 21b of the mark member 21 (see FIG. 7B). At the second detecting point, the first detecting sensor 11 is located in the center of the detected portion 21b. The second detecting sensor 12 outputs an ON signal to the address counter of the controller 10. Then, at a third detecting point, the first detecting sensor 11 detects the other end of the detected portion 21b of the mark member 21 (see FIG. 7C). At the third detecting point, the first detecting sensor 11 outputs an OFF signal to the address counter of the controller 10. Then, finally, at a fourth detecting point, the second detecting sensor 12 detects the other end of the detected portion 21b of the mark member 21 (see FIG. 7D). At the fourth detecting point, the first detecting sensor 11 is located in the center of the non-detected portion 21c. The second detecting sensor 12 outputs an OFF signal to the address counter of the controller 10. As described above, the address counter of the controller 10 detects the four detecting points of each mark member 21 on the basis of the combination of the first detecting sensor 11 and second detecting sensor 12. The addresses are assigned to the respective four detecting points.

Now, a description will be given of graduations assigned to between the addresses.

The encoder 17F (17R) is configured to output signals for N pulses (N is a natural number) between the addresses. The encoder 17F (17R) is also configured to measure the moving distance of the vehicle 1 by diving the space between the addresses into N pieces. Simply speaking, as shown in FIG. 6, (N−1) graduations are assigned to the space between the addresses. The space between the addresses is interpolated by the graduations. The encoder 17F (17R) counts the number of graduations between the spaces to accurately determine the moving position of the vehicle 1.

According to the present embodiment, the distance between the addresses is 10 [mm]. The encoder 17F (17R) is configured to output signals for 1,000 pulses between the addresses, that is, to be able to measure the moving distance of the vehicle 1 on the order of 0.01 [mm].

FIG. 8 shows a positional information counter provided in the controller 10 of the vehicle 1. The positional information counter comprises an address counter and a graduation counter. The last three digits are a value input by the encoder 17F (17R) and indicate the count number of a graduation between the addresses. The fourth and subsequent digits from the last are a value input by the detecting sensors 11, 12 and indicate the count number of an address. An address is set using the combination of the count number of the address and the count number of the graduation between the addresses. For example, the address shown in FIG. 8 indicates the 395th graduation of the address 120. The address indicates that the vehicle 1 is 1203.95 [mm] from a reference point. This is one of the absolute addresses provided along the detected member 20. In connection with the stop control of the vehicle 1, the vehicle 1 can be stopped at an arbitrary position on the detected member 20 by specifying the address.

The controller 10 of the vehicle 1 is also configured to reset the measurement of the moving distance by the encoder 17F (17R) to an origin every time the detecting sensor 11 or detecting sensor 12 detects the address of the mark member 21 of the detected member 20. The measurement of the moving distance is thus carried out without being affected by errors from previous operations. This makes the moving body system more reliable. Specifically, every time the detecting sensor 11 or detecting sensor 12 detects the address of the mark member 21 of the detected member 20, the graduation counter is reset to the origin "000". Further, the address counter is incremented by one during forward movement and decremented by one during backward movement. Furthermore, every time a pulse signal is received from the encoder 17F (17R), the count in the graduation counter is incremented by one during forward movement and decremented by one during backward movement. With this configuration, the controller 10 determines the moving position on the basis of the absolute address regardless of the moving direction of the vehicle 1.

Now, a description will be given of the deceleration and stop control of the vehicle 1.

When a destination (any of the processing devices 4 or the like) for the vehicle 1 is specified, a running program is constructed in which acceleration and deceleration timings and the like are written. The running of the vehicle 1 is then controlled in accordance with the running program. Before reaching the address of the mark member 21 immediately before the stop target position, the controller 10 of the vehicle 1 detects the addresses of the mark members 21, 21, . . . of the detected member 20 to roughly determine the moving position. The controller 10 thus controls the moving speed of the vehicle 1 on the basis of the detected moving position. Moreover, during running, the detecting device 13, provided in the vehicle 1, detects positional information on the detected members 23 dotted along the running rails 2, 2. The controller thus checks whether or not the detecting sensor 11 or detecting sensor 12 has failed to detect any address. If the detecting sensor 11 or detecting sensor 12 should fail to detect any address, corrections will be made on the basis of the positional information on the detected member 23 detected by the detecting device 13. This makes the system more reliable. The deceleration control of the vehicle 1 is performed on the detected address. As the vehicle 1 nears the stop target position, it is decelerated so that it reaches an about-to-stop speed at the detecting point between the address to which the stop target position belongs and the preceding address. The about-to-stop speed is such that the vehicle 1 can be immediately stopped at any time. Between the preceding address and the stop target position, the vehicle 1 uses the encoder 17F (17R)

to measure the moving distance from this address at small increments on the order of 0.01 [mm]. Thus, the vehicle 1 is controllably stopped precisely at the stop target position.

The above configuration avoids the situation in which there is a difference between the actual moving distance and the moving distance determined by the vehicle 1 and in which the vehicle thus starts to decelerate prematurely and starts to run at the about-to-stop speed considerably before the stop position.

As a result, the vehicle 1 can move fast to the stop target position. The moving body system thus has an improved workability. Further, according to the present invention, the controller 10 of the vehicle 1 can substantially accurately determine its moving position at any position on the moving path. The vehicle 1 can thus be precisely stopped at any position on the moving path. This makes the moving body system more convenient.

In the above description, the moving path of the vehicle 1, which is a moving body, is composed of a linear moving path. However, the moving path of the vehicle 1 is not limited to the linear moving path. The moving path may include a curved portion. Further, the moving path of the vehicle 1 may be configured to have a branching or joining portion. In this case, the moving path is configured as described below.

FIG. 9 shows a branching portion (or joining portion) on the moving path of the vehicle 1. Running rails 2M, 2M are laid along a main path, whereas running rails 2S, 2S are laid along a sub-path. The branching portion 5 is provided with a switching member (not shown in the drawings) that switches the moving path of the vehicle 1 between the main path and the sub-path.

Alternatively, the vehicle 1 itself may be provided with switching means for switching the moving path. In this case, the moving path is configured as described below. A guide rail along the main path and a guide rail along the sub-path are provided before and after the branching portion 5. The guide rails are arranged parallel immediately before the branching portion 5. The vehicle 1 is provided with a branching device comprising a guide roller selectively applied to the guide rail of the main path or the guide rail of the sub-path. The paired branching devices are provided in the front and rear of the vehicle 1 in its moving direction. The paired branching devices and the guide rails constitute the switching means. Each branching device comprises three guide rollers each having an axis corresponding to a vertical direction. The branching device is placed so that a central guide roller rolls and passes between the two guide rollers, arranged parallel with each other immediately before the branching portion. The central guide roller is fixed, and the guide rollers on the opposite sides of the central guide roller can be freely elevated and lowered in the vertical direction. Immediately before the branching portion 5, the vehicle 1 elevates (or lowers) and sets one of the rollers at the same height as that of the central guide roller. Thus, the guide rail of the main path or the guide rail of the sub-path is sandwiched between the above guide roller and the central guide roller. Consequently, the vehicle 1 is guided along the guide rail and can thus select its own moving path.

Further, a detected member 24 is provided immediately before the branching portion 5 and along the running rail 2M of the main path. After the branching portion 5, the main path and the sub-path are provided with detected members 25, 26, respectively, along their running rails 2M, 2S (or 2T). The detected members 24, 25, 26 are provided for a purpose different from that for the detected members 23, 23, . . . The detected members 24, 25, 26 are provided to allow determination as to whether the vehicle 1 is running on the main path or the sub-path after passing the branching portion 5. According to the present embodiment, the detecting means for detecting the detected members 23, 23, is composed of the same detecting device 13 as that constituting the detecting means for detecting the detected members 24, 25, 26, in order to reduce the number of parts required. However, these detecting means may be composed of separate detecting means.

Bar codes or RFID tags are stuck to the detected members 24, 25, 26, the bar codes or RFID tags indicating positional information on the positions of the detected members 24, 25, 26. The detecting device 13 reads path information from the detected members 24, 25, 26 to determine the moving path on which the vehicle is running.

Further, a detected member 20M is provided along the running rail 2M. A detected member 20S is provided along the running rail 2S. Each of the detected members 20M, 20S is provided with the large number of mark members 21, 21, . . . in the moving direction of the vehicle 1. Each mark member 21 comprises a detected portion 21b that can be detected by the detecting sensors 11, 12 of the vehicle 1 and a non-detected portion 21c that is not detected by the detecting sensors 11, 12 (see FIG. 2).

The detected members 20M, 20S are connected together at the branching portion 5. In the branching portion 5, the running rails 2M, 2M of the main path interfere with the detected member 20S of the sub-path. Accordingly, as shown in FIG. 9 and FIG. 10, the running rails 2M, 2M, 2S, 2S are laid on a floor surface. The detected members 20M, 20S are installed above the vehicle 1.

In the branching portion 5, the running rails 2M, 2M of the main path cross the detected member 20S of the sub-path at different levels.

Poles 40, 40, . . . are installed along the running rail 2M (or 2S) at predetermined intervals so as to extend in the vertical direction. An arm portion 40a is provided at an upper end of each of the poles 40 to support the detected member 20M (or 20S). The arm portion 40a projects from the pole main body toward the running rails 2M, 2M (or 2S, 2S). The detected member 20M (or 20S) hangs from the arm portion 40a. In this case, the detected member 20M (or 20S) is turned upside down compared to the configuration in FIG. 2 so that the comb teeth face downward.

As shown in FIG. 10, a support member 9 is attached to an upper end of one side of the vehicle 1. A bracket 15 is mounted on the support member 9. The bracket 15 is obtained by turning the bracket 14 upside down so that it appears like the letter "U" in a front view. The bracket 15 is fixedly placed on a top surface of the vehicle 1 so that it appears like the letter "U" in a front view.

The length of the bracket 15 in the moving direction of the vehicle 1 is about half of the width D of the detected portion 21b of the detected member 20M (or 20S) in the moving direction of the vehicle 1. The first detecting sensor 11 and the second detecting sensor 12 are attached to the opposite ends of the bracket 15 in the moving direction of the vehicle 1. The spacing W between the first detecting sensor 11 and the second detecting sensor 12 is half of the width D of the detected portion 21b of the detected member 20M (or 20S) (in the above relation, n=0). The remaining part of the configuration of the vehicle 1 is similar to that of the above configuration, which does not have any branching potion 5. Thus, its description is omitted.

When the length of the bracket 15 in the moving direction of the vehicle 1 is thus small, regardless of whether the vehicle 1 advances into the main path or the sub-path, the bracket 15 of the vehicle 1 does not interfere with the detected portion 21b of the detected member 20S (or 20M) on the path opposite to the one into which the vehicle 1 advances, as shown in FIG. 11.

Alternatively, the detected member 20T, placed along the running rail 2S of the sub-path, may be configured as shown in FIG. 12. The detected member 20T is also configured similarly to the detected member 20. However, the detected member 2T is not connected to the detected member 20M, placed along the running rail 2M of the main path.

The leading end of end of the detected member 2T (in the joining portion, the trailing end) is placed outside the running rails 2M, 2M of the main path. The detected member 20T of the sub-path is thus configured so as not to cross the running rails 2M, 2M of the main path. Accordingly, with this configuration, the detected members 20M, 20T can be laid on the floor surface together with the running rails 2M, 2M, 2S, 2S. The vehicle 1 can be configured as shown in FIG. 4. With this configuration, the length, in the moving direction of the vehicle 1, of the bracket 14 to which the first detecting sensor 11 and the second detecting sensor 12 are attached need not be small compared to the bracket 15. When the width of the detected portion 21b of the detected member 20M (or 20T) in the moving direction of the vehicle 1 is defined as D, the spacing W between the first detecting sensor 11 and the second detecting sensor 12 may be set so as to satisfy the above relation.

Normally, in the branching portion 5, the stop control of the vehicle 1 is not performed. If the vehicle 1 is to be stopped in a section of the running rails 2S, 2S of the sub-path which section is located after the branch and in which the detected member 2T is not placed, the following operation is performed only in this section: output pulses from the encoder 17R (or 17F) start to be accumulated when the detecting device 13, mounted on the vehicle 1, detects the detected member 24 placed immediately before the branching portion 5. Further, if the stop control is not performed in this section and the vehicle 1 advances from the branching portion 5 into the sub-path, the following operation is performed: when the detecting device 13 detects the detected member 26 placed near the leading end of the detected member 20T, the combination of detection of the mark members of the detected member 20T and detection of output pulses from the encoder 17F (or 17R) is started. This allows the determination of the current position of the vehicle on the sub-path.

A similar process is also executed if the vehicle 1 runs to the joining portion 5. If the vehicle 1 runs leftward in FIG. 12 and is to be stopped in a section of the running rails 2S, 2S of the sub-path which section is located immediately before the joining portion 5 and in which the detected member 2T is not place, the following operation is performed only in this section: when the vehicle 1 running along the sub-path uses the detecting device 13 to detect the detected member 26 placed immediately before the joining portion 5, output pulses from the encoder 17R (or 17F) start to be accumulated to perform stop control. Further, if the stop control is not performed in this section and the vehicle 1 advances from the sub-path through the joining portion 5 into the main path, when the detecting device 13 detects the detected member 24 placed immediately after the junction, the address counter of the positional information counter is switched to the address corresponding to the main path. This will be described later in detail.

Then, the running control of the vehicle 1 will be described. The controller 10 of the vehicle 1 is already provided with a running instruction. Accordingly, the vehicle 1 itself already knows which path to take at the branching portion 5. However, a process described below is used to confirm that the vehicle 1 has surely advanced into the path to be taken.

When the detecting device 13 detects the detected member 24, the controller 10 of the vehicle 1 recognizes that the vehicle 1 has reached the branching portion 5. Then, the next detected member detected by the detecting device 13 allows the controller 10 to determine along which of the main path and the sub-path the vehicle 1 is running. Specifically, when the detecting device 13 detects the detected member 25, the controller 10 recognizes that the vehicle 1 is running along the main path. On the other hand, when the detecting device 13 detects the detected member 26, the controller 10 recognizes that the vehicle 1 is running along the sub-path.

Further, the controller 10 of the vehicle 1 is adapted to uniquely determine the current position of the vehicle 1 on the system on the basis of the combination of detection of the mark members 21 of the detected members 20M, 20S or (20T) and detection of the detected members 24, 25, 26.

FIG. 13 shows the positional information counter provided in the controller 10 of the vehicle 1. The positional information counter comprises a path counter in addition to the address counter and the graduation counter. For example, the last three digits correspond to the graduation counter and indicate an input value from the encoder 17F (or 17R) which is the count number of a graduation between addresses. The fourth to seventh digits from the last correspond to the address counter and indicate an input value from the detecting sensors 11, 12 which is the count number of an address. The first digit corresponds to the path counter and indicates the moving path along which the vehicle 1 is running.

The path counter displays numerical values or the like which correspond to the respective paths. For example, "0" indicates that the vehicle 1 is running along the main path, "1" indicates that the vehicle 1 is running along a first sub-path branched from the main path, and "2" indicates that the vehicle 1 is running along a second sub-path branched from the main path. The display in the path counter is switched when the detecting device 13 of the vehicle 1 detects the detected member 24, 25, 26 in the branching portion 5 (or joining portion).

Specifically, when the vehicle 1 approaches the branching portion 5 and its detecting device 13 detects the detected member 24, the path counter displays a numerical value indicating the path into which the vehicle 1 is to advance after passing the branching portion 5. That is, if the vehicle 1 running along the main path is to continue to run on the main path after passing the branching portion 5, the path counter displays "0". If the vehicle 1 is to advance into the sub-path after passing the branching portion 5, the path counter displays "1". When the detecting device 13 of the vehicle 1 detects the detected member 25 or detected member 26 of the path into which the vehicle 1 is to advance, the numerical value displayed in the path counter and indicating path information is established.

In this case, if the vehicle 1 should advance into a path different from the expected one after passing the branching portion 5, then when the detecting device 13 of the vehicle 1 detects the detected member 25 or detected member 26 of the path different from the expected one, the numerical value displayed in the path counter and indicating path information will be changed to one corresponding to the path different from the expected one.

Further, it is assumed that the vehicle 1 runs to the joining portion 5. Then, if the vehicle 1 runs leftward in FIG. 9, when the detecting device 13 detects the detected member 25 or 26, the controller 10 of the vehicle 1 recognizes that the vehicle 1 is to reach the joining portion 5. Then, when the detecting device 13 detects the detected member 24, the controller 10 recognizes that the vehicle 1 has passed the joining portion 5. The path counter then displays a numerical value corresponding to the path taken by the vehicle 1 after the junction (in FIG. 9, the main path). The address counter displays an address corresponding to the path taken by the vehicle 1 after the junction. For example, if the vehicle 1 advances from the sub-path into the main path, the path counter of the positional information counter displays a numerical value corresponding to the sub-path. Further, the address counter displays an address corresponding to the sub-path. However, when the detecting device 13 of the vehicle 1 detects the detected member 24, the path counter of the positional information counter is switched to a numeral value corresponding to the main path. Further, the address counter is switched to an address corresponding to the main path.

In the above description, the moving path of the vehicle 1 branches to two paths or two paths are joined together to form one path. However, the moving body system is similarly configured if the path of the vehicle 1 branches to three paths or if three paths are joined together to form one path.

With the above configuration, the controller 10 of the vehicle 1 uniquely determines the current position of the vehicle 1 on the moving body system on the basis of the combination of detection of the mark members 21 of the detected members 20M, 20S or (20T), detection of the detected members 24, 25, 26, and detection of output pulses from the encoder 17F (or 17R).

Taking the case of the automated guided vehicle system, a description has been given of the moving body system in which the moving body moves in the horizontal direction. However, the present invention is applicable to a moving body system in which the moving body moves in the vertical direction or obliquely upward or downward along a slope. The moving direction of the moving body is not particularly limited.

BRIEF DESCRIPTION OF THE DRAWINGS

FIG. 6 is a diagram showing the configuration of addresses on the detected member 20.

Figure 1:
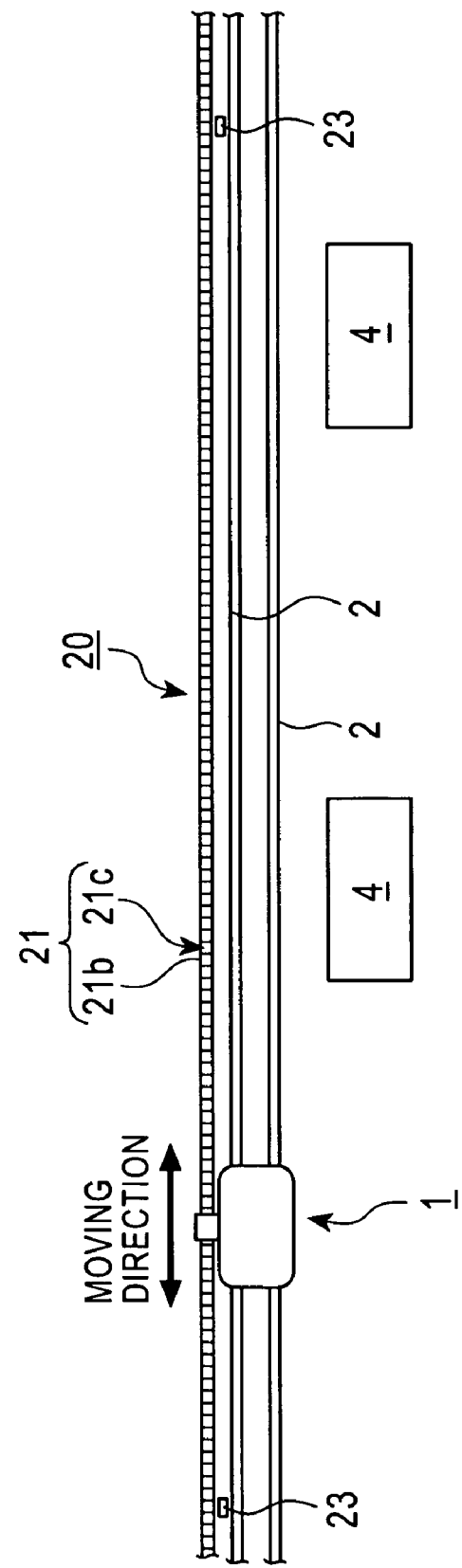
FIG. 1 is a plan view generally showing the configuration of an automated guided vehicle system.
Figure 2:
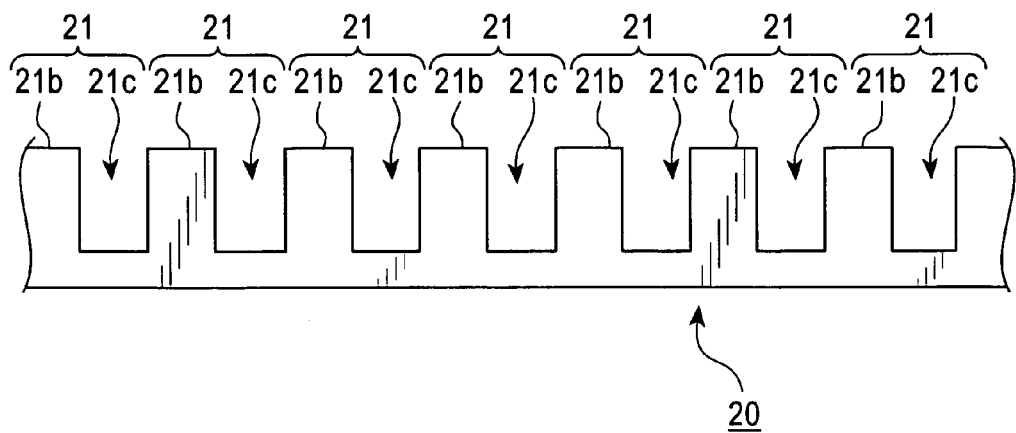
FIG. 2 is a side vide of a detected member 20.
Figure 3:
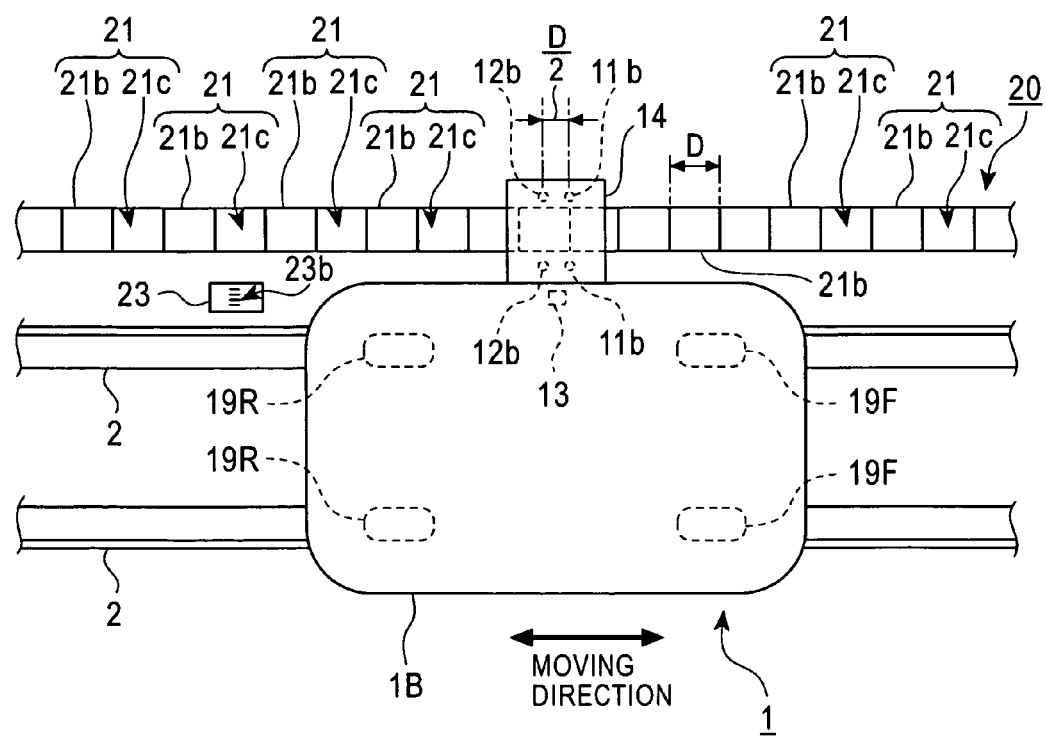
FIG. 3 is a plan view showing the configuration of a vehicle 1.
Figure 4:
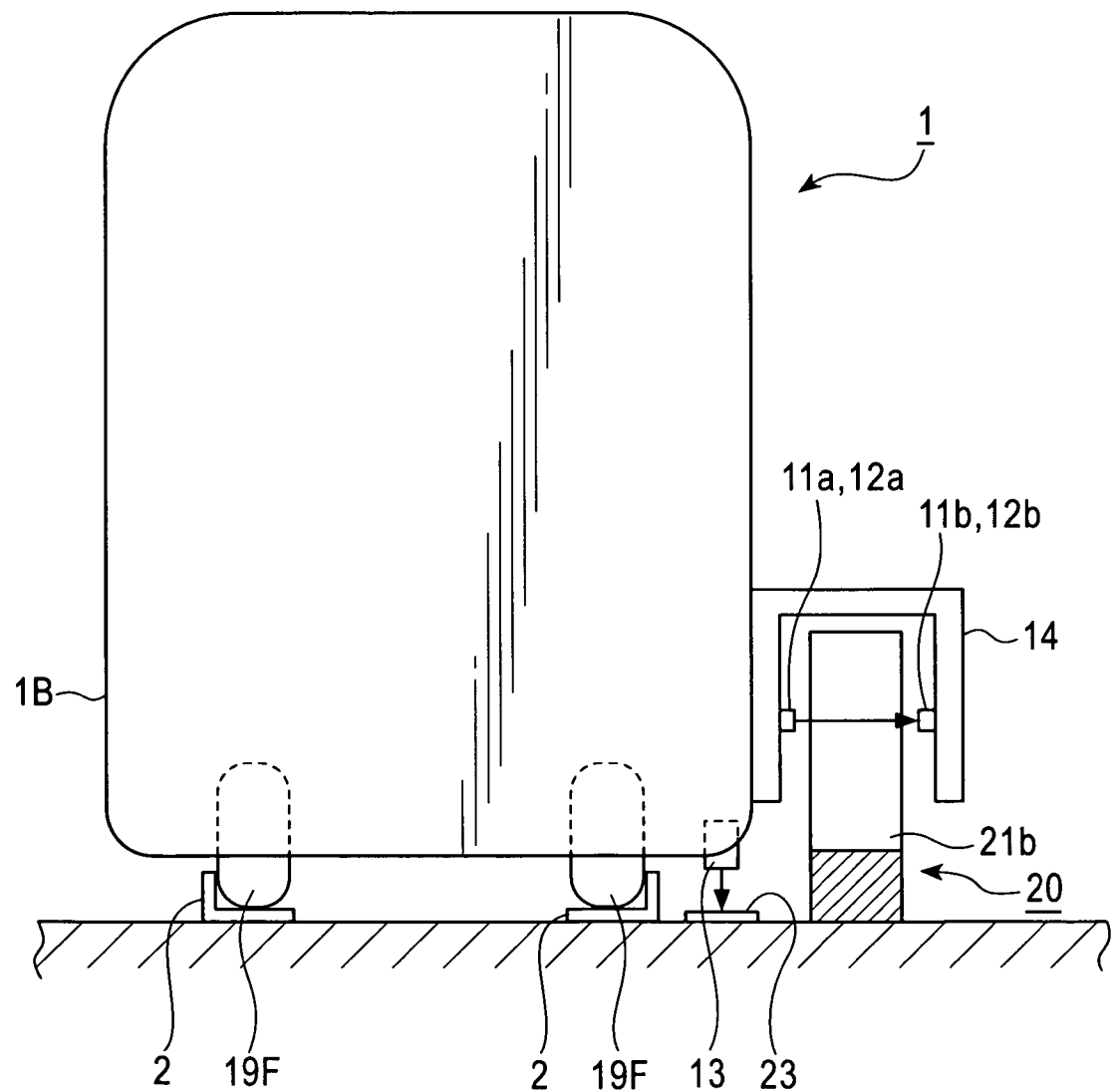
FIG. 4 is a front view showing the configuration of the vehicle 1.
Figure 5:
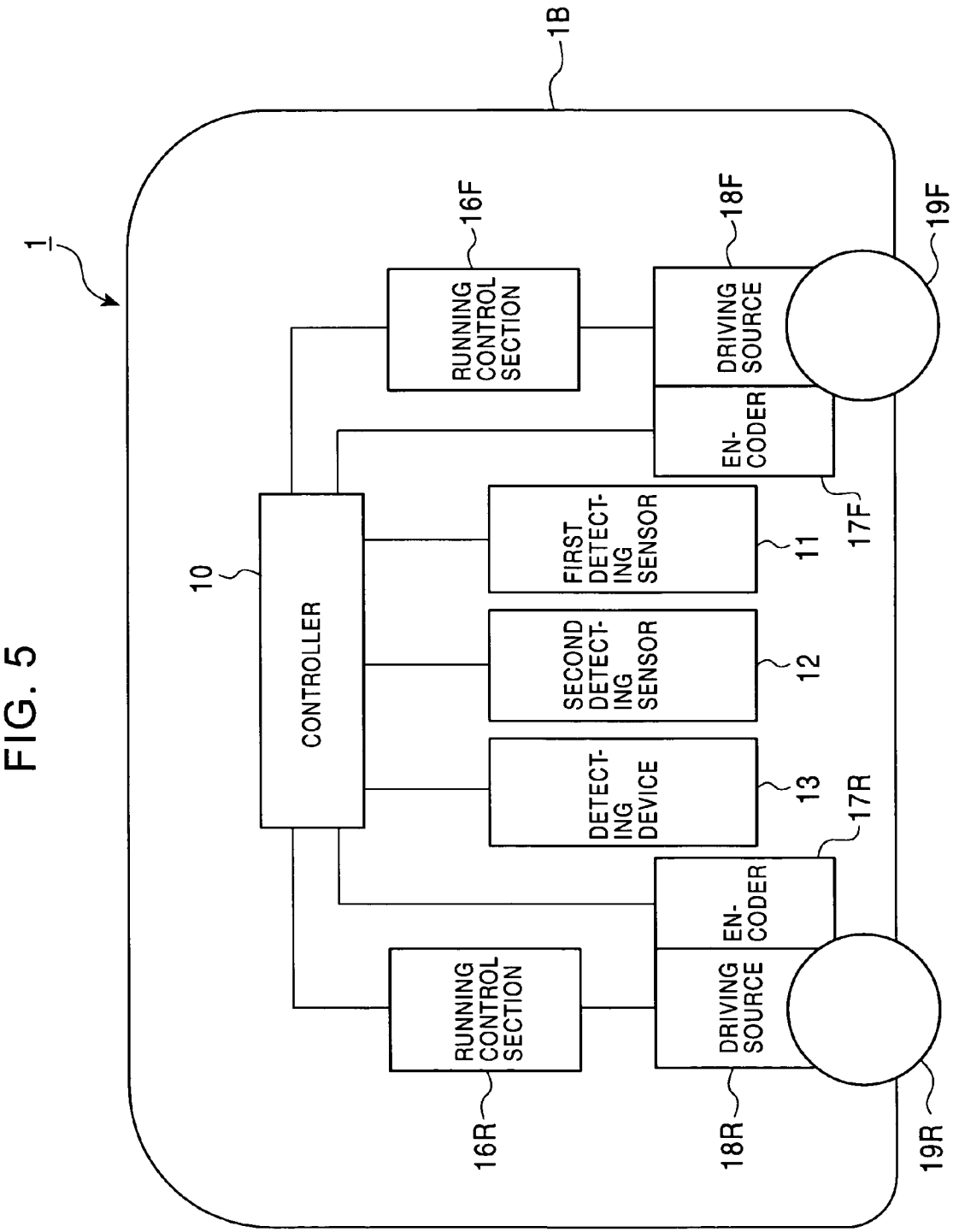
FIG. 5 is a block diagram of a control configuration of the vehicle 1.
Figure 7A:
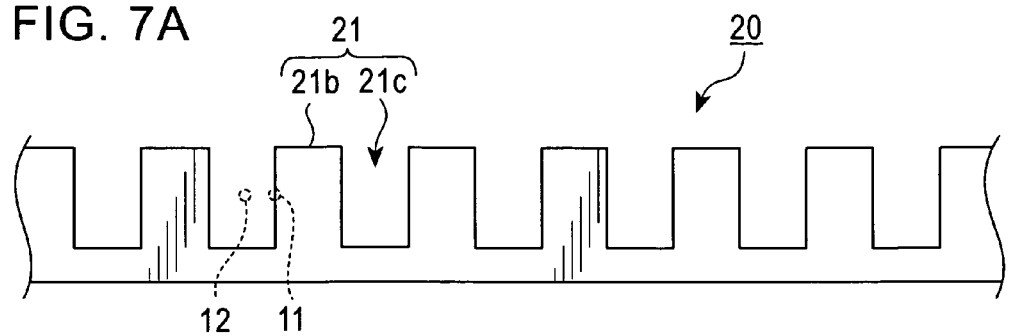
FIG. 7 is a side view of the detected member 20.
Figure 7B:
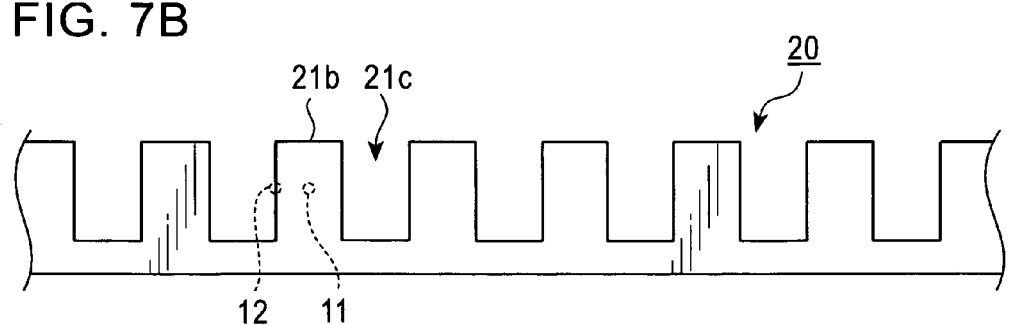
Figure 7C:
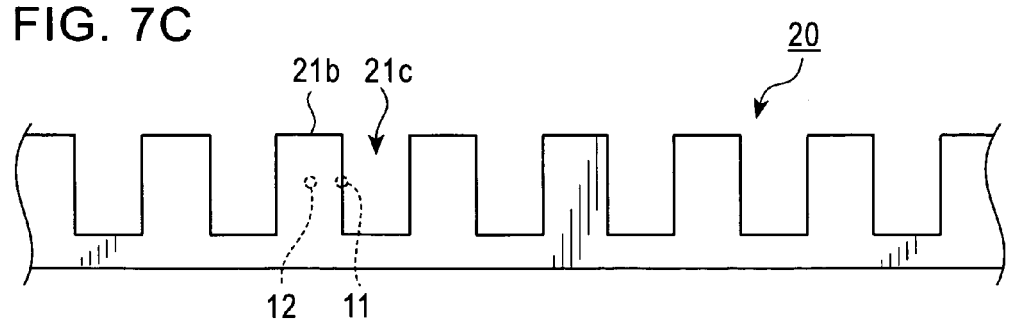
Figure 7D:
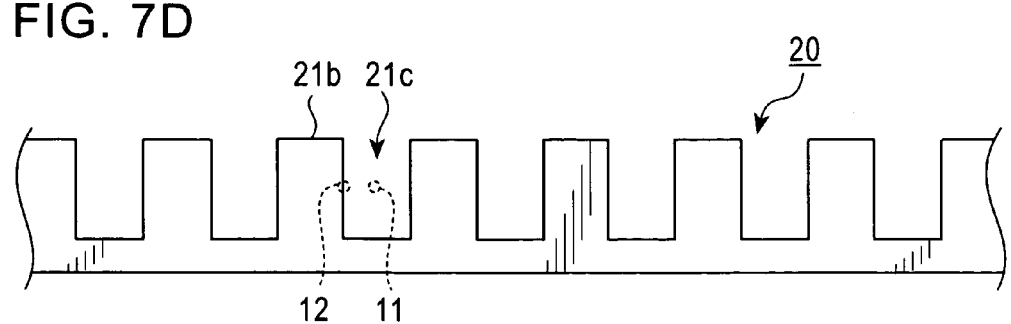
Figure 8:
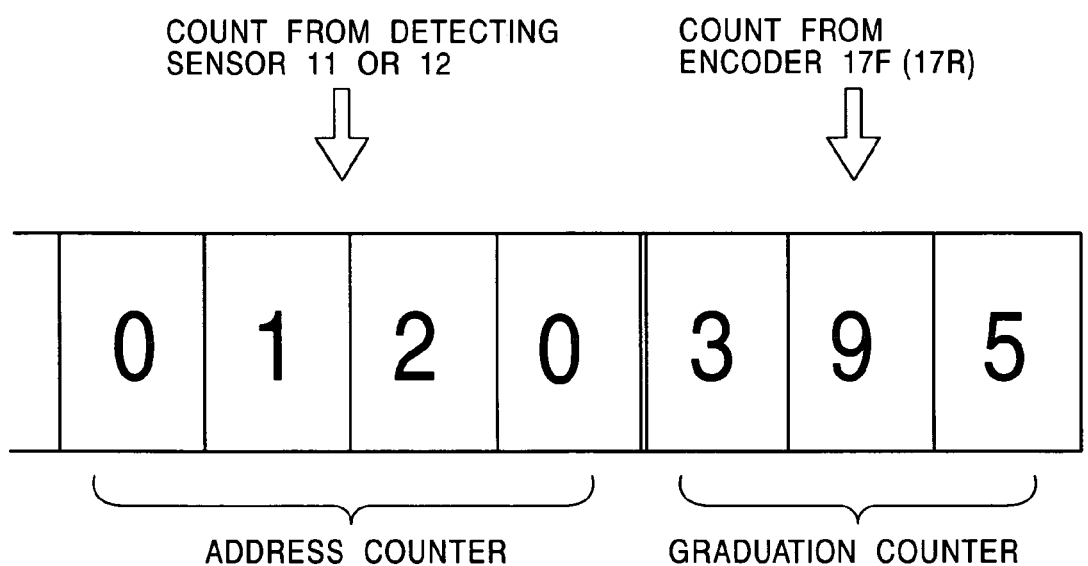
FIG. 8 is a diagram illustrating the configuration of a counter.
Figure 9:
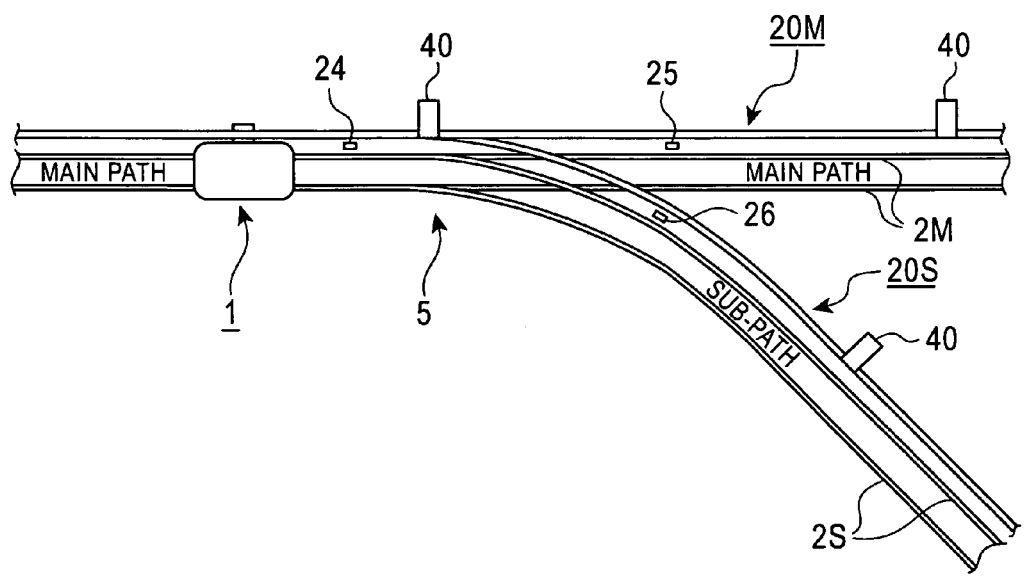
FIG. 9 is a plan view of a moving path of the vehicle 1 which has a branching portion 5.
Figure 10:
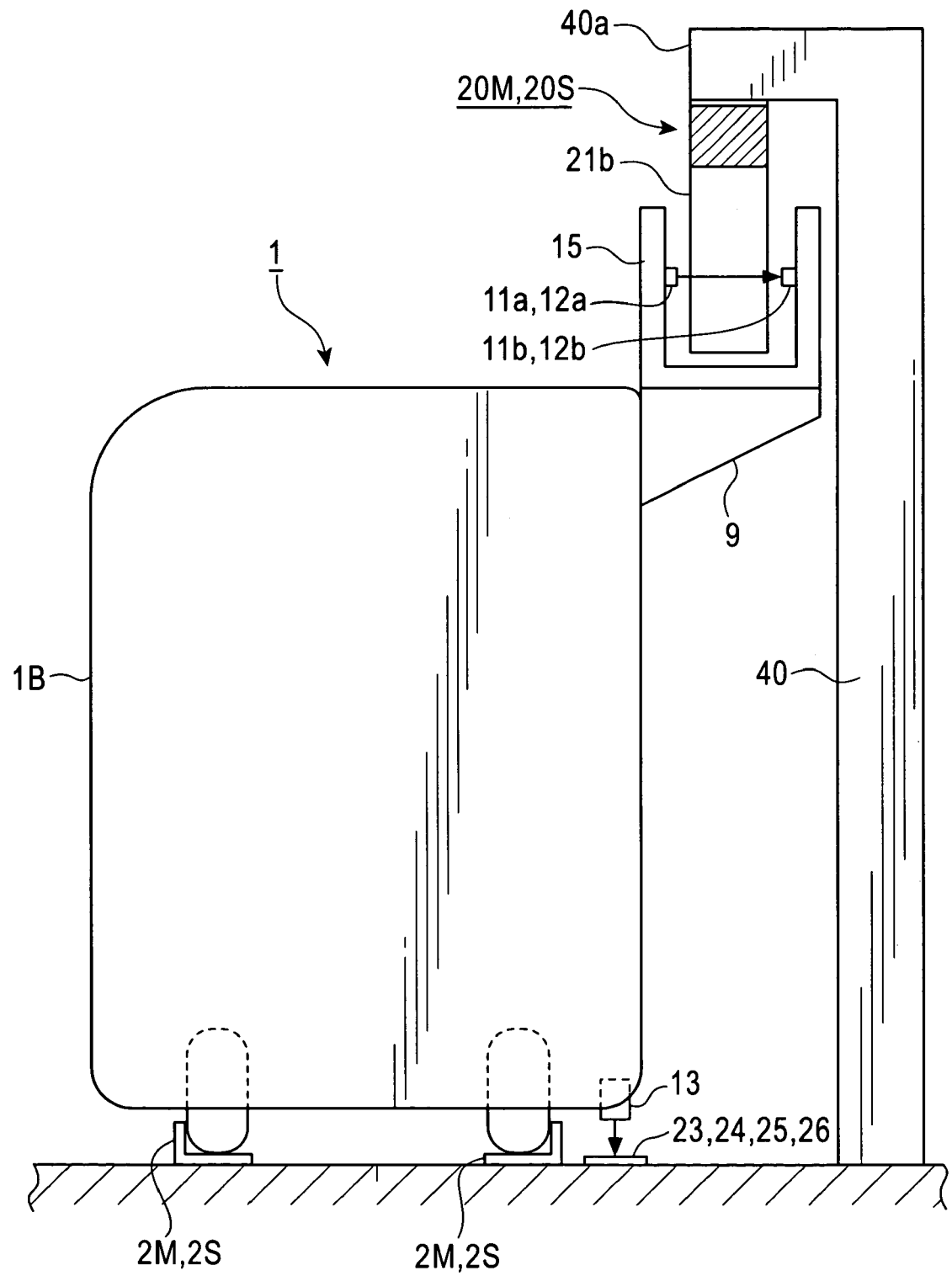
FIG. 10 is a front view showing the configuration of the vehicle 1.
Figure 11:
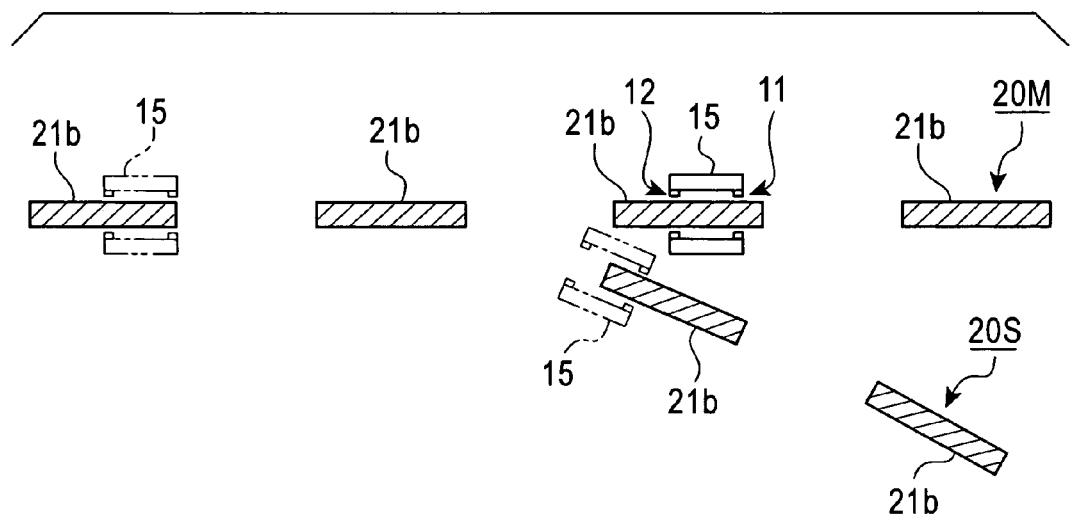
FIG. 11 is a plan view showing detected members 20M, 20M on the moving path of the vehicle 1 which has the branching portion 5.
Figure 12:
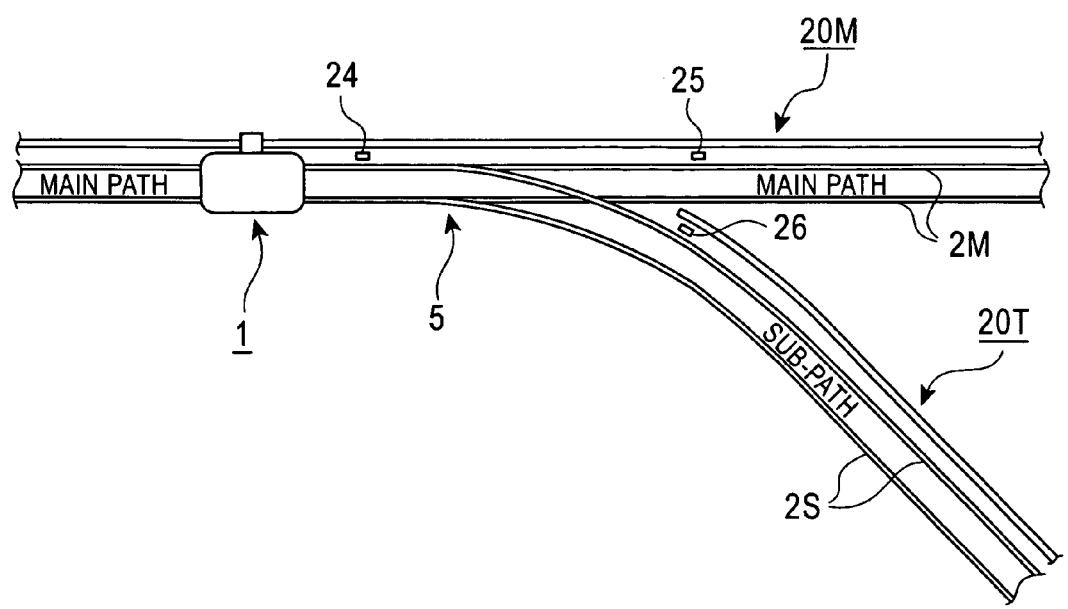
FIG. 12 is a plan view showing the moving path of the vehicle 1 which has the branching portion 5.
Figure 13:
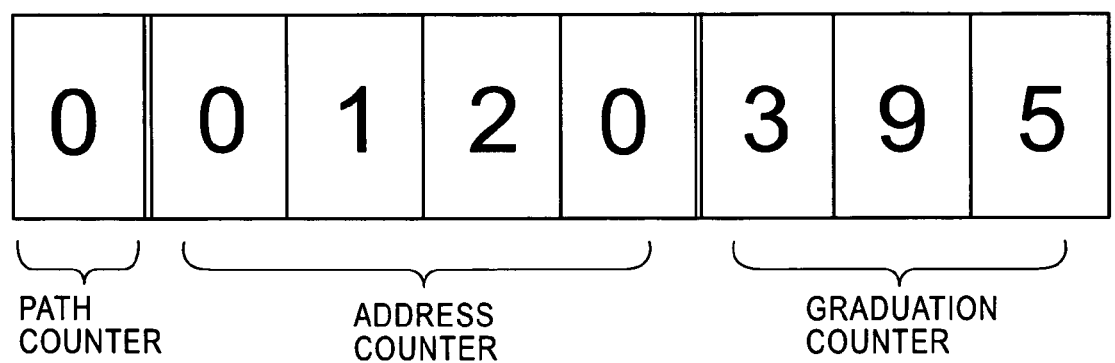
FIG. 13 is a diagram illustrating the configuration of a counter.
Figure 14A:
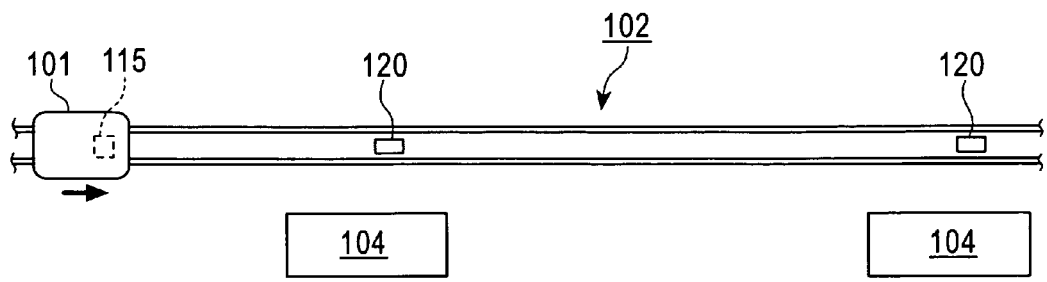
FIG. 14 is a plan view generally showing the configuration of a conventional automated guided vehicle system.
Figure 14B:
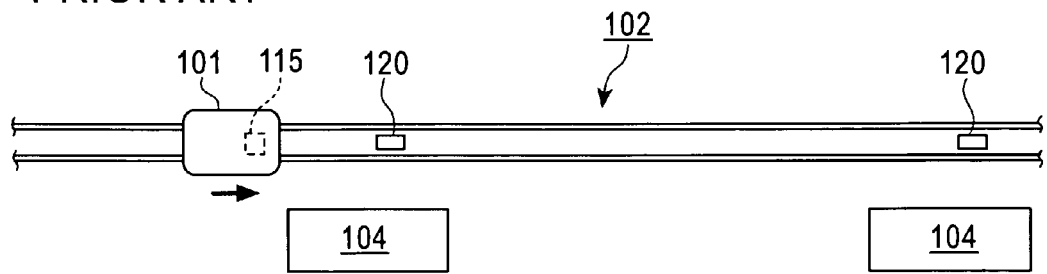
Figure 14C:
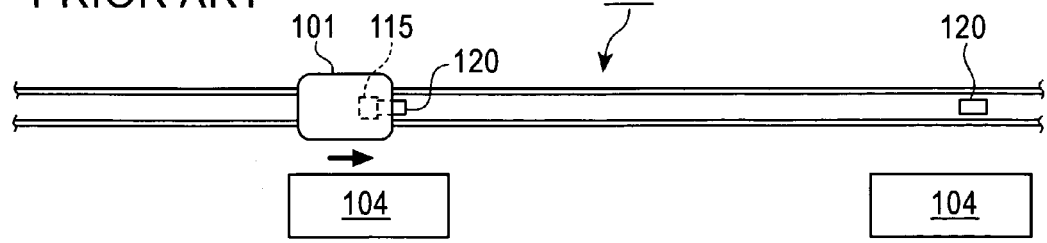
Figure 14D:
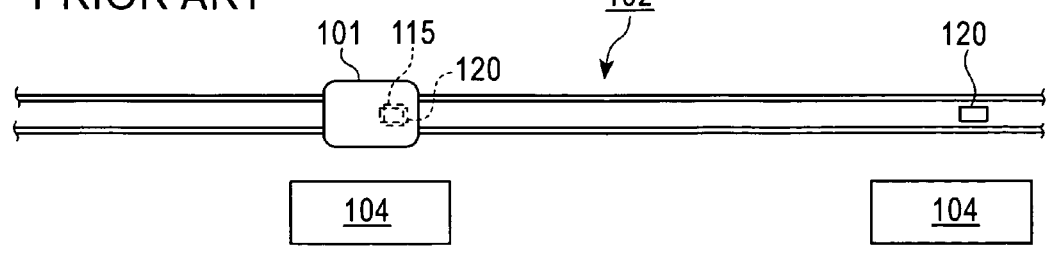
Figure 15A:
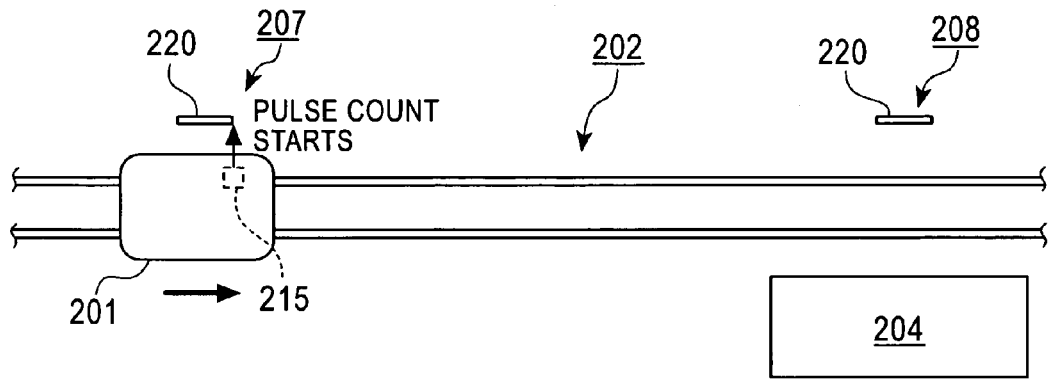
FIG. 15 is a plan view generally showing the configuration of the conventional automated guided vehicle system.
Figure 15B:
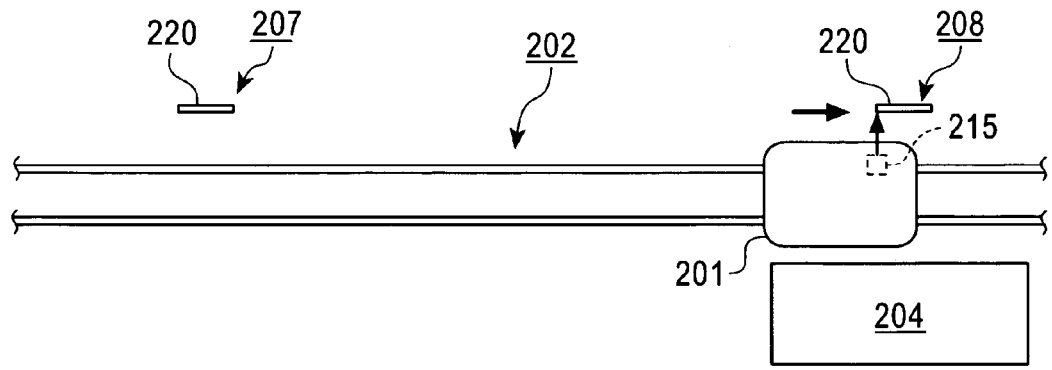
Figure 15C:
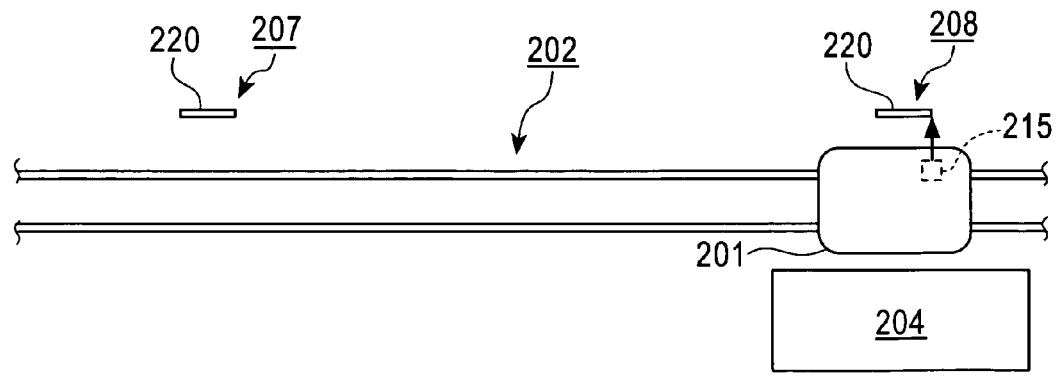

The invention claimed is:

1. A moving body system comprising:
a moving body that moves along a moving path and
a detected member laid along the moving path,
wherein the detected member comprises a plurality of mark members in a direction in which the moving body moves,
wherein the moving body comprises detecting means for detecting the mark members of the detected member,
wherein each of the mark members comprises a detected portion detected by the detecting means and a non-detected portion not detected by the detecting means,
wherein the detected member is configured as comb teeth in which a comb tooth portion is the detected portion and a void between the comb teeth is the non-detected portion,
wherein the width of the detected portion in the moving direction of the moving body is equal to that of the non-detected portion in the moving direction of the moving body,
wherein the detecting means comprises a first detecting means and a second detecting means arranged in the moving direction of the moving body, and
wherein the moving path of the moving body has a branching portion that branches to at least two paths, an additional detected member is provided on each of the branching paths and the moving body is provided with additional detecting means for detecting the additional detected members.

2. A moving body system comprising:
a moving body that moves along a moving path and
a detected member laid along the moving path,
wherein the detected member comprises a plurality of mark members in a direction in which the moving body moves,
wherein the moving body comprises detecting means for detecting the mark members of the detected member,
wherein each of the mark members comprises a detected portion detected by the detecting means and a non-detected portion not detected by the detecting means,
wherein the detected member is configured as comb teeth in which a comb tooth portion is the detected portion and a void between the comb teeth is the non-detected portion,
the width of the detected portion in the moving direction of the moving body is equal to that of the non-detected portion in the moving direction of the moving body,
wherein the detecting means comprises a first detecting means and a second detecting means arranged in the moving direction of the moving body, and
wherein the moving path has a joining portion in which at least two paths are joined together, and a second detected member is provided on a resulting path so that the second detecting means can detect the second detected member.

3. The moving body system according to claim 1 or claim 2, wherein the detected members have positional information, and the detecting means reads the positional information from the detected members.

4. The moving body system according to claim 1 or claim 2, wherein the moving body comprises:
an encoder that measures a moving distance and
a control means for controlling the moving speed of the moving body by determining a moving position while using the detecting means to detect the mark members of the detected member until the mark member of the detected member located immediately before a stop target position is reached, wherein between the mark member located immediately before the stop target position and the stop target position, the control means uses the encoder to measure the moving distance from the mark member located immediately before the stop target position to the stop target position, and wherein the control means stops the moving body at the stop target position.

5. The moving body system according to claim 4, wherein the control means resets the measurement of the moving distance by the encoder to an origin every time the detecting member detects a detecting point on the mark member of the detected member.

* * * * *